United States Patent
Wang et al.

(10) Patent No.: US 11,166,188 B2
(45) Date of Patent: Nov. 2, 2021

(54) METHOD FOR TRANSMITTING INFORMATION, METHOD FOR RECEIVING INFORMATION, PDCP ENTITY, AND COMPUTER STORAGE MEDIUM

(71) Applicants: CHINA MOBILE COMMUNICATION CO., LTD RESEARCH INSTITUTE, Beijing (CN); China Mobile Communications Corporation, Beijing (CN)

(72) Inventors: Yingying Wang, Beijing (CN); Junshuai Sun, Beijing (CN); Xueyan Huang, Beijing (CN); Chihlin I, Beijing (CN)

(73) Assignees: China Mobile Communication Ltd., Research Institute, Beijing (CN); China Mobile Communications Corporation, Beijing (CN)

( * ) Notice: Subject to any disclaimer, the term of this patent is extended or adjusted under 35 U.S.C. 154(b) by 0 days.

(21) Appl. No.: 16/469,397

(22) PCT Filed: Dec. 14, 2017

(86) PCT No.: PCT/CN2017/116171
§ 371 (c)(1),
(2) Date: Jun. 13, 2019

(87) PCT Pub. No.: WO2018/108127
PCT Pub. Date: Jun. 21, 2018

(65) Prior Publication Data
US 2020/0112870 A1 Apr. 9, 2020

(30) Foreign Application Priority Data

Dec. 14, 2016 (CN) .......................... 201611156021.8

(51) Int. Cl.
*H04W 28/02* (2009.01)
*H04L 1/16* (2006.01)
(Continued)

(52) U.S. Cl.
CPC ....... *H04W 28/0263* (2013.01); *H04L 1/1642* (2013.01); *H04W 28/06* (2013.01); *H04W 80/02* (2013.01); *H04W 80/08* (2013.01)

(58) Field of Classification Search
None
See application file for complete search history.

(56) References Cited

U.S. PATENT DOCUMENTS

2003/0008653 A1* 1/2003 Jiang .................. H04W 36/02
455/436
2003/0128705 A1* 7/2003 Yi .......................... H04L 5/0042
370/394
(Continued)

FOREIGN PATENT DOCUMENTS

CN 101030842 A 9/2007
CN 101374331 A 2/2009
(Continued)

*Primary Examiner* — Ayanah S George
(74) *Attorney, Agent, or Firm* — Price Heneveld LLP

(57) ABSTRACT

A method for transmitting information, a method for receiving information, a PDCP entity, and a computer storage medium are provided. The method includes: determining, by a Packet Data Convergence Protocol (PDCP) entity, an information transmitting order of at least one Radio Link Protocol (RLC) entity managed by the PDCP entity, and determining, based on the information transmitting order, a reordering sequence number corresponding to each of the at least one RLC entity; determining a Protocol Data Unit (PDU) to be transmitted by each of the at least one RLC entity, and adding the reordering sequence number to the PDU; and mapping the PDU to a corresponding RLC entity.

15 Claims, 8 Drawing Sheets

(51) Int. Cl.
  *H04W 28/06* (2009.01)
  *H04W 80/02* (2009.01)
  *H04W 80/08* (2009.01)

(56) References Cited

U.S. PATENT DOCUMENTS

| | | | |
|---|---|---|---|
| 2006/0165045 A1* | 7/2006 | Kim | H04W 28/06 370/349 |
| 2012/0082096 A1 | 4/2012 | Cave et al. | |
| 2016/0065700 A1* | 3/2016 | Yi | H04L 69/04 370/328 |
| 2017/0085492 A1 | 3/2017 | Xiao et al. | |

FOREIGN PATENT DOCUMENTS

| | | |
|---|---|---|
| CN | 102638328 A | 8/2012 |
| CN | 103141051 A | 6/2013 |
| CN | 104935413 A | 9/2015 |
| EP | 2169915 A1 | 3/2010 |

\* cited by examiner

METHOD FOR TRANSMITTING INFORMATION, METHOD FOR RECEIVING INFORMATION, PDCP ENTITY, AND COMPUTER STORAGE MEDIUM

CROSS-REFERENCE TO RELATED APPLICATION

This application is the U.S. national phase of PCT Application No. PCT/CN2017/116171 filed on Dec. 14, 2017, which claims a priority to Chinese Patent Application No. 201611156021.8 filed on Dec. 14, 2016, the disclosures of which are incorporated in their entirety by reference herein.

TECHNICAL FIELD

The present disclosure relates to information processing technologies in the communication field, in particular to a method for transmitting information, a method for receiving information, and a Packet Data Convergence Protocol (PDCP) entity, and a computer storage medium.

BACKGROUND

With the rapid development of mobile internet and Internet of Things, 5G network needs to provide more traffic, to provide service for more terminals and support more connections. In order to meet the requirements of new services such as an enhanced mobile broadband service and a low latency and high reliability service, a series of solutions, such as dual connection, C/U separation and C-RAN distributed network architecture are put forward. In these solutions, there is a one-to-many mapping relationship between PDCP and RLC. Previously, ordering is performed by the RLCs, and delivering PDUs in order can only be guaranteed within one RLC bearer; while one of bearers of the current PDCP needs to be mapped to multiple RLC bearers, and the delivering in order among multiple RLC bearers mapped to one PDCP bearer can not be guaranteed. Accordingly, ordering can not be performed quickly while receiving the PDUs, which brings a new challenge.

SUMMARY

The present disclosure is to provide a method for transmitting information, a method for receiving information, a packet data convergence protocol (Packet Data Convergence Protocol, PDCP) entity, and a computer storage medium, so as to solve the foregoing problem in the art.

In order to solve the above problem, the present disclosure provides a method for transmitting information, including:

determining, by a Packet Data Convergence Protocol (PDCP) entity, an information transmitting order of at least one Radio Link Protocol (RLC) entity managed by the PDCP entity, and determining, based on the information transmitting order, a reordering sequence number corresponding to each of the at least one RLC entity;

determining a Protocol Data Unit (PDU) to be transmitted by each of the at least one RLC entity, and adding the reordering sequence number to the PDU; and mapping the PDU to a corresponding one of the at least one RLC entity.

The present disclosure provides a method for receiving information, including:

receiving, by a PDCP entity, at least one PDU transmitted by at least one RLC entity;

extracting a reordering sequence number from each PDU of the at least one PDU; and determining, based on the reordering sequence number, an information transmitting order of the RLC entity corresponding to each PDU, and ordering the at least one PDU at least based on the information transmitting order.

The present disclosure provides a PDCP entity. The PDCP entity includes:

a reordering sequence number generation unit, configured to determine an information transmitting order of at least one RLC entity managed by the PDCP entity, and determine, based on the information transmitting order, a reordering sequence number corresponding to each of the at least one RLC entity;

an information processing unit, configured to determine a Protocol Data Unit (PDU) to be transmitted by each of the at least one RLC entity, and add the reordering sequence number to the PDU; and a mapping unit, configured to map the PDU to a corresponding one of the at least one RLC entity.

The present disclosure provides a PDCP entity. The PDCP entity includes:

an information receiving unit, configured to receive at least one PDU transmitted by at least one RLC entity;

a reordering sequence number extracting unit, configured to extract a reordering sequence number from each PDU of the at least one PDU; and an information processing unit, configured to determine, based on the reordering sequence number, an information transmitting order of the RLC entity corresponding to each PDU, and order the at least one PDU at least based on the information transmitting order.

The present disclosure provides a PDCP entity, including a processor and a memory configured to store computer programs that are executable in the processor, and the processor is configured to execute steps of the above methods when the computer programs are executed.

The present disclosure provides a computer storage medium, storing computer executable instructions for implementing steps of the above methods when executed.

The method for transmitting information, the method for receiving information, and the PDCP entity, and the computer storage medium are provided in the present disclosure. A reordering sequence number can be added to the information transmitting order corresponding to an RLC entity mapped to a PDU, when the PDU is transmitted by a PDCP entity. Therefore, the PDUs transmitted by different RLC entities can be distinguished according to the reordering sequence number, so that the PDUs can be ordered on a receiving side according to the reordering sequence number in addition to the original SN of the PDUs. The delay of ordering PDUs can be reduced, and the processing efficiency on the receiving side can be improved.

DETAILED DESCRIPTION

The present disclosure will be described below in detail in combination with drawings and specific embodiments.

First Embodiment

Figure 1:
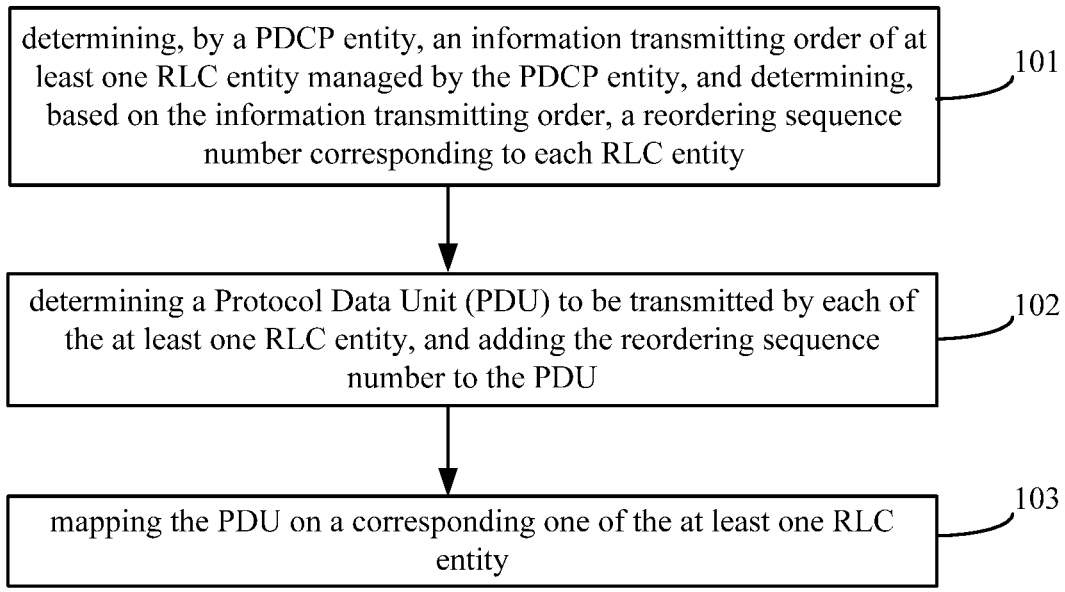
FIG. 1 is a schematic flowchart of a method for transmitting information according to an embodiment of the present disclosure.

Referring to FIG. 1, a method for transmitting information is provided according to an embodiment of the present disclosure. The method includes steps 101 to 103.

Step 101 including: determining, by a PDCP entity, an information transmitting order of at least one RLC entity managed by the PDCP entity, and determining, based on the information transmitting order, a reordering sequence number corresponding to each RLC entity.

Step 102 including: determining a Protocol Data Unit (PDU) to be transmitted by each of the at least one RLC entity, and adding the reordering sequence number to the PDU.

Step 103 including: mapping the PDU on a corresponding one of the at least one RLC entity.

Figure 2:
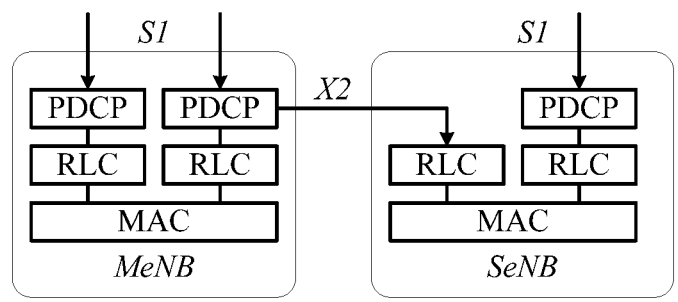
FIG. 2 is a first schematic diagram of a processing scenario according to an embodiment of the present disclosure.
Figure 3:
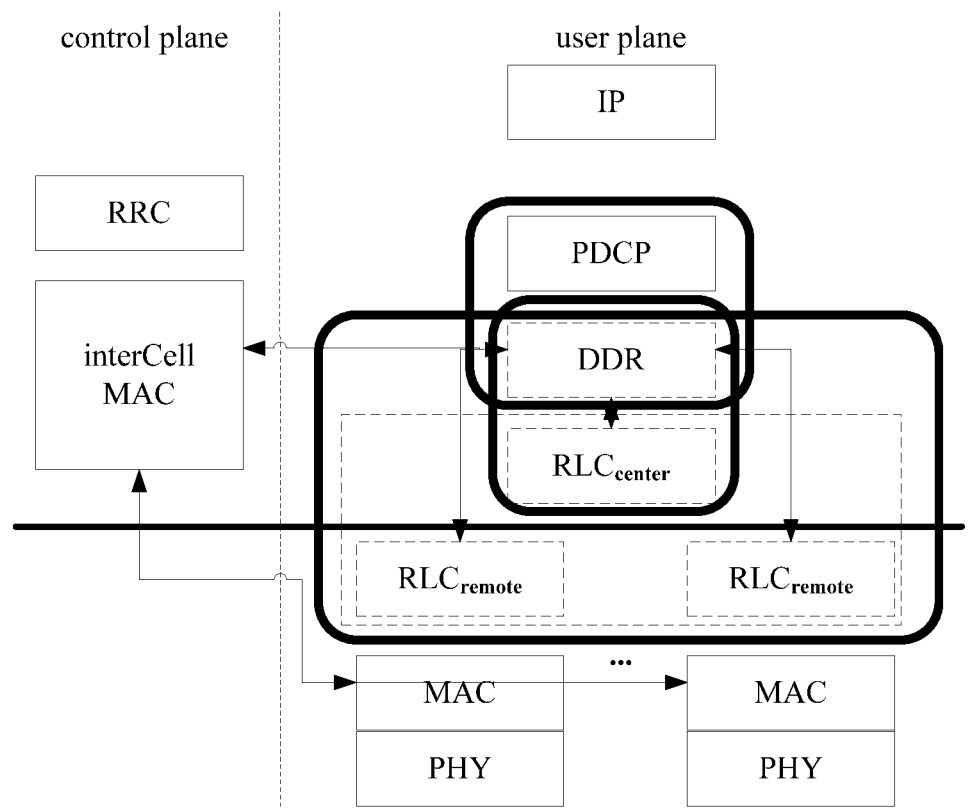
FIG. 3 is a second schematic diagram of a processing scenario according to an embodiment of the present disclosure.

The connection function between the PDCP entity and at least one RLC entity may be as shown in FIG. 2 and FIG. 3. It can be seen from the figures that one or more RLC entities may be managed by one PDCP entity. In addition, a MAC entity and other functional entity as shown in the figures will not be described herein. There is a one-to-many mapping relationship between PDCP and RLC, and one of the bearers of PDCP may be mapped to multiple RLC bearers.

Figure 4:
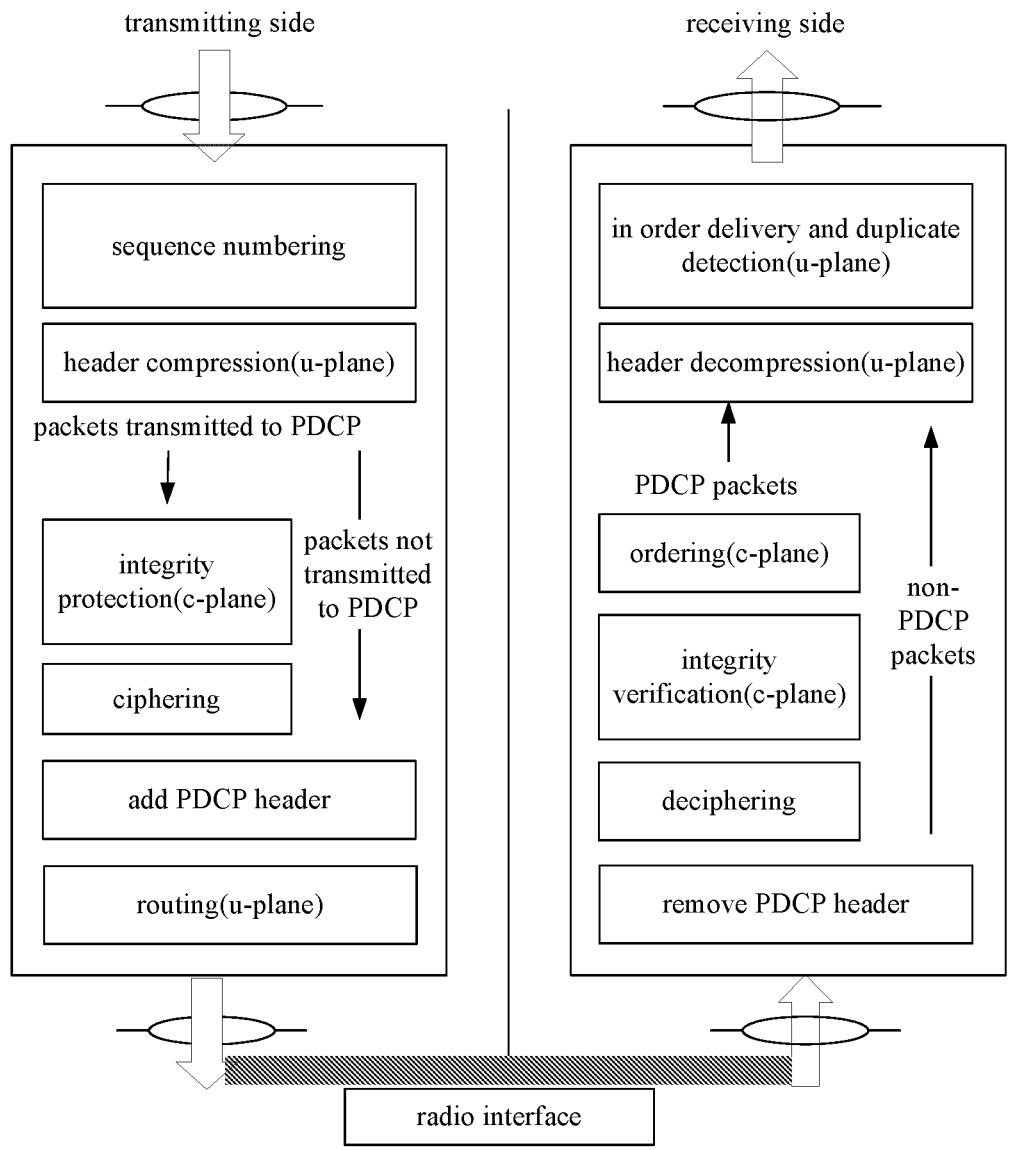
FIG. 4 is a third schematic diagram of a processing scenario according to an embodiment of the present disclosure.
Figure 5:
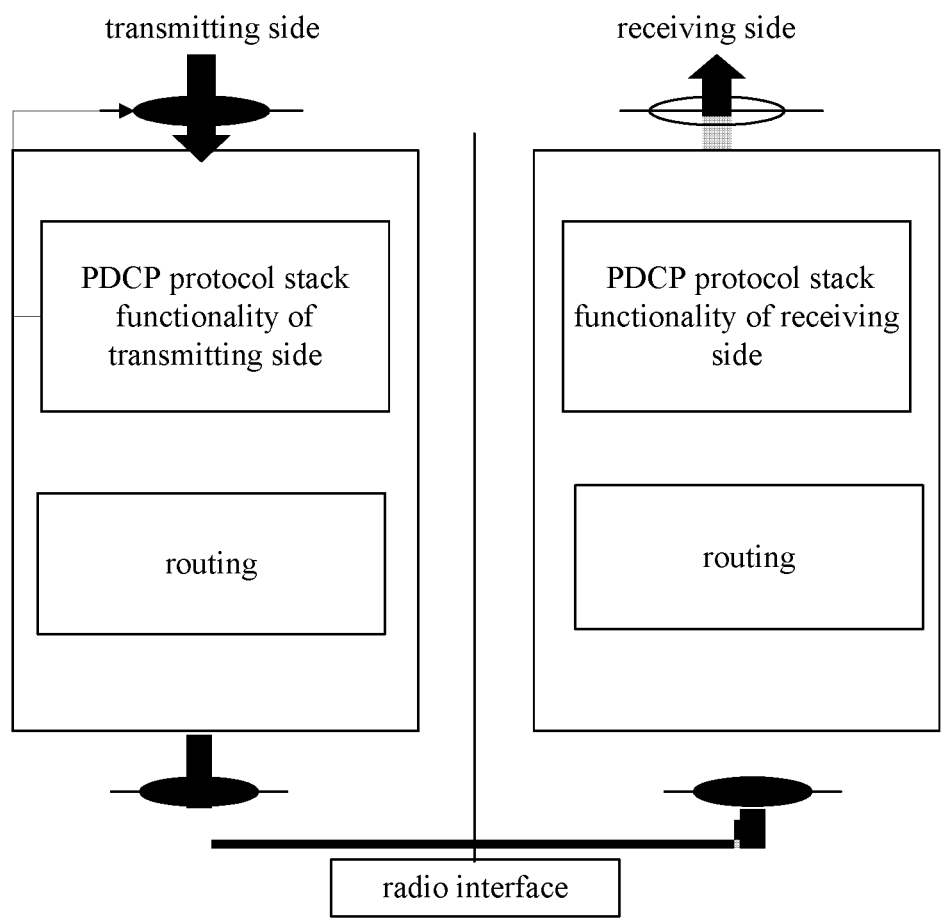
FIG. 5 is a fourth schematic diagram of a processing scenario according to an embodiment of the present disclosure.

Reference may be made to FIG. 4 for the functionality of the PDCP entity, and the routing function and ordering function may be enhanced. Referring to FIG. 5, the functionality of the PDCP entity provided by the embodiment may include routing function and ordering function. Data routing among multiple RLC entities and RSN distribution used in ordering may be implemented through the routing function. When routing data to different RLC entities, it is required to associate it to a single RSN. The order of PDCP PDUs to be transmitted by different RLC entities may be determined with RSN which is used in a sequential and cycling way. With the RSN, data received by different RLC entities may be ordered through the ordering function.

Figure 6:
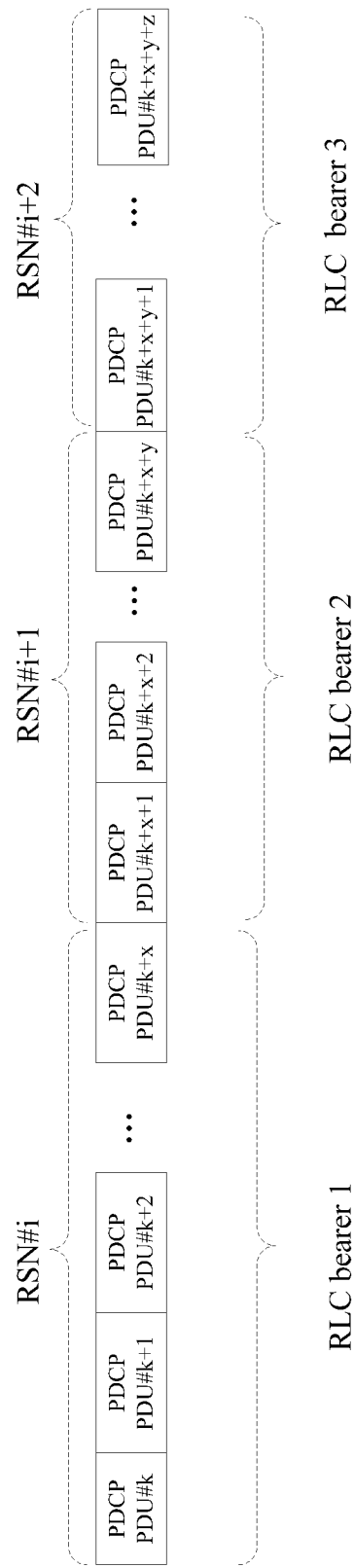
FIG. 6 is a fifth schematic diagram of a processing scenario according to an embodiment of the present disclosure.

In other words, the information transmitting order of different RLC entities may be determined by the PDCP entity based on multiple RLC entities managed by the PDCP entity in the step 101. For example, as shown in FIG. 6, there are three RLC entities managed, which respectively correspond to three bearers that are bearer 1, bearer 2, and bearer 3. The reordering sequence number of each RLC entity may be determined according to a transmitting order, after the respective transmitting order of the three RLC entities has been determined. The reordering sequence number may be represented as RSN, that is RSN #i, RSN #i+1 and RSN #i+2 as shown in FIG. 6, and i may be an integer. In other words, the order of transmitting PDCP PDUs by the three RLC entities may be distinguished by the reordering sequence number.

Based on the foregoing scenario, before determining a PDU to be transmitted by each of the RLC entities, the method further includes: assigning, by the PDCP entity, a sequence number (SN) to at least one PDU to be transmitted.

The way of assigning the RSN to each PDU may be as follows. One RSN may be applied to PDCP PDUs group to be transmitted to a same RLC simultaneously, and the RSNs may be numbered according to the order of multiple PDCP PDU groups.

Further, in an embodiment of the present disclosure, the method further includes: adding the SN and the reordering sequence number to the PDU. Positions where the SN and the reordering sequence number added to the PDU may be preset number of data bits added before or after original SN data bits of the PDU. The reordering sequence number may be added through the preset number of data bits.

It can be seen that, based on the foregoing solutions, a reordering sequence number can be added to the information transmitting order corresponding to an RLC entity mapped to a PDU, when the PDU is transmitted by a PDCP entity. Therefore, the PDUs transmitted by different RLC entities can be distinguished according to the reordering sequence number, so that the PDUs can be ordered on a receiving side according to the reordering sequence number in addition to the original SN of the PDUs. The delay of ordering PDUs can be reduced, and the processing efficiency on the receiving side can be improved.

Second Embodiment

Figure 7:
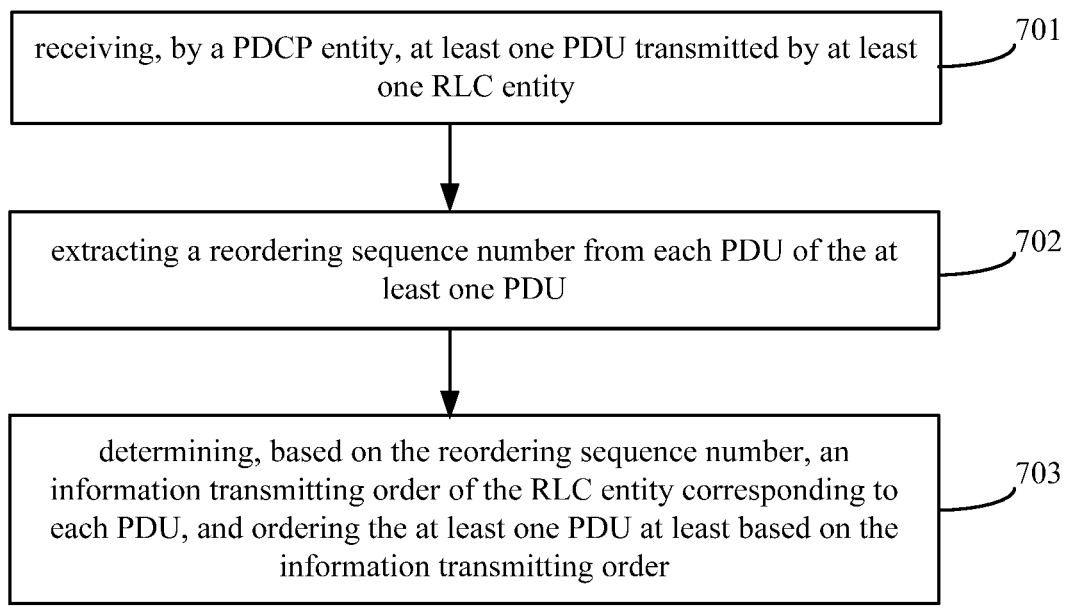
FIG. 7 is a schematic flowchart of a method for receiving information according to an embodiment of the present disclosure.

Referring to FIG. 7, a method for receiving information is provided according to an embodiment of the present disclosure. The method includes steps 701 to 703.

Step 701 including: receiving, by a PDCP entity, at least one PDU transmitted by at least one RLC entity.

Step 702 including: extracting a reordering sequence number from each PDU of the at least one PDU.

Step 703 including: determining, based on the reordering sequence number, an information transmitting order of the RLC entity corresponding to each PDU, and ordering the at least one PDU at least based on the information transmitting order.

The connection function between the PDCP entity and at least one RLC entity may be as shown in FIG. 2 and FIG. 3. It can be seen from the figures that one or more RLC entities may be managed by one PDCP entity. In addition, a MAC entity and other functional entity as shown in the figures will not be described herein. There is a one-to-many mapping relationship between PDCP and RLC, and one of the bearers of PDCP may be mapped to multiple RLC bearers.

Referring to FIG. 5, the functionality of a PDCP entity provided by the embodiment of the present disclosure may include routing function. Data routing among multiple RLC entities and RSN distribution used in ordering may be implemented through the routing function. When routing data to different RLC entities, it is required to associate it to a single RSN. The order of PDCP PDUs to be transmitted by different RLC entities may be determined with RSN which is used in a sequential and cycling way.

Based on the above scenario, before extracting the reordering sequence number from each PDU of the at least one PDU, the method further includes: extracting, by the PDCP entity, a sequence number (SN) from each PDU of the at least one PDU as received.

Further, in an embodiment, the method further includes: ordering, the at least one PDU based on the SN and the reordering sequence number.

Positions of the SN and the reordering sequence number within each PDU may be preset number of data bits added prior to or subsequent to the original SN data bits of the PDU. The reordering sequence number may be added through the preset number of data bits.

Reordering includes ordering PDCP PDUs transmitted by multiple RLC entities, which ensures PDCP SNs in order, while maintaining values of HFN and COUNT.

Figure 8:
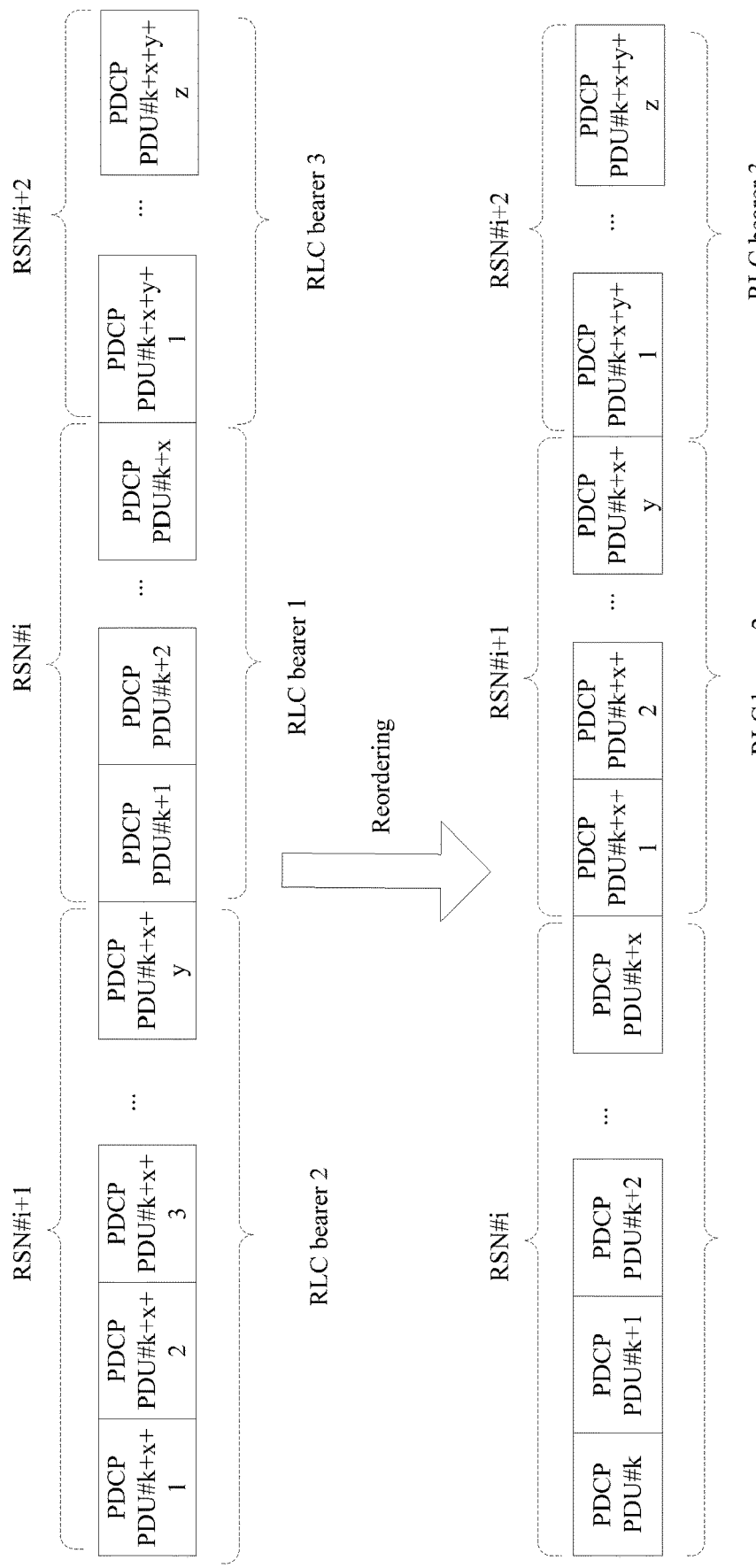
FIG. 8 is a sixth schematic diagram of a processing scenario according to an embodiment of the present disclosure.

The original reordering function is optimized. Sequence numbering function is responsible for maintaining the order of the PDCP SNs. Routing function is responsible for transmitting PDCP PDUs to different RLC entities while maintaining the order of the PDCP SNs. The RSN is used in a sequential and cycling way. A schematic diagram of routing functions of a receiving side may be as shown in FIG. 5, where one RSN may be used by multiple PDCP PDUs transmitted to a same RLC entity simultaneously. A schematic diagram of the reordering function on a receiving side is as shown in FIG. 8, where these PDCP PDUs may be ordered by the PDCP by using RSN. In a non-reestablishment case, delivering PDUs in order can only be guaranteed within one RLC, and the PDCP PDUs among RLCs may be ordered according to RSN on receiving side. With the RSN and SN two-stage approach, all PDCP PDUs may be reordered by connecting multiple segments of PDCP PDUs, each of which is ordered internally in sequence in accordance with the RSN. Compared with the related art only using a PDCP SN ordering approach, the process of ordering can be simplified. In a reestablishment case, some of PDCP SNs may be out of sequence as the RLC could not guarantee that data delivered to the PDCP is in sequence, especially in AM case. In the related art, in the case where there is a big difference between the respective air interface delays, there may be an excessively wide span between SNs of PDCP transmitted through multiple RLC entities. There may be issues that the reordering window may be not proper and the value of COUNT may be wrongly calculated, as there are only operations of increasing by one and decreasing by one for maintaining the value of COUNT in the related art. In the present disclosure, by adding the RSN, SNs of an excessively wide span may be replaced by RSNs which may be of a smaller span and ordered easily. The maintainability of the value of COUNT can be guaranteed by maintaining the order of RSNs. The RSN can be considered as a further extension of the length of the SN or a two-stage PDCP SN.

It can be seen that, based on the above solutions, a reordering sequence number can be added to the information transmitting order corresponding to an RLC entity mapped to a PDU, when the PDU is transmitted by a PDCP entity. Therefore, the PDUs transmitted by different RLC entities can be distinguished according to the reordering sequence number, so that the PDUs can be ordered at a receiving side according to the reordering sequence number in addition to the original SN of the PDUs. The delay of ordering PDUs can be reduced, thereby the processing efficiency on the receiving side can be improved.

Three Embodiment

Figure 9:
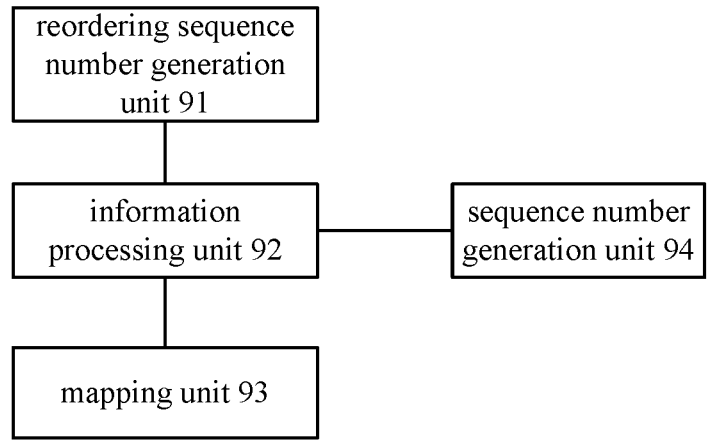
FIG. 9 is a first schematic diagram of a structure of a PDCP according to an embodiment of the present disclosure.

Referring to FIG. 9, a PDCP entity is provided according to an embodiment of the present disclosure. The PDCP entity may include:

a reordering sequence number generation unit 91, configured to determine an information transmitting order of at least one RLC entity managed by the PDCP entity, and determine, based on the information transmitting order, a reordering sequence number corresponding to each RLC entity;

an information processing unit 92, configured to determine a Protocol Data Unit (PDU) to be transmitted by each of the RLC entity, and add the reordering sequence number to the PDU; and a mapping unit 93, configured to map the PDU on a corresponding RLC entity.

The connection function between the PDCP entity and at least one RLC entity may be as shown in FIG. 2 and FIG. 3. It can be seen from the figures that one or more RLC entities may be managed by one PDCP entity. In addition, a MAC entity and other functional entity as shown in the figures will not be described herein. There is a one-to-many mapping relationship between PDCP and RLC, and one of the bearers of PDCP may be mapped to multiple RLC bearers.

Referring to FIG. 5, the functionality of a PDCP entity provided by the embodiment may include a routing function. Data routing among multiple RLC entities and RSN distribution used in ordering may be implemented through the routing function. When routing data to different RLC entities, it is required to associate it to a single RSN. The order of PDCP PDUs to be transmitted by different RLC entities may be determined with RSN which is used in a sequential and cycling way.

In other words, the information transmitting order of different RLC entities may be determined by the PDCP entity based on multiple RLC entities managed by the PDCP entity. For example, as shown in FIG. 6, there are three RLC entities managed, which respectively correspond to three bearers that are bearer 1, bearer 2, and bearer 3. The reordering sequence number of each RLC entity may be determined according to a transmitting order, after the respective transmitting order of the three RLC entities has been determined. The reordering sequence number may be represented as RSN, that is RSN #i, RSN #i+1 and RSN #i+2 as shown in FIG. 6, and i may be an integer. In other words, the order of transmitting PDCP PDUs by the three RLC entities may be distinguished by the reordering sequence number.

Based on the foregoing scenario, the PDCP entity may further include: a sequence number generation unit 94, configured to assign a sequence number (SN) to at least one PDU to be transmitted.

Further, the information processing unit 92 may be configured to add the SN and the reordering sequence number to the PDU. Positions where the SN and the reordering sequence number added to the PDU may be preset number of data bits added before or after original SN data bits of the PDU. The reordering sequence number may be added through the preset number of data bits.

It can be seen that, based on the foregoing solutions, a reordering sequence number can be added to the information transmitting order corresponding to an RLC entity mapped to a PDU, when the PDU is transmitted by a PDCP entity. Therefore, the PDUs transmitted by different RLC entities can be distinguished according to the reordering sequence number, so that the PDUs can be ordered on a receiving side according to the reordering sequence number in addition to the original SN of the PDUs. The delay of ordering PDUs can be reduced, and accordingly, the processing efficiency on the receiving side can be improved.

Four Embodiment

Figure 10:
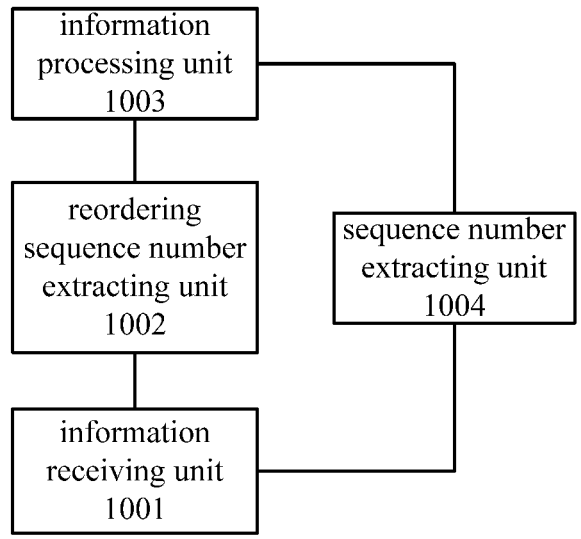
FIG. 10 is a second schematic diagram of a structure of a PDCP according to an embodiment of the present disclosure.

Referring to FIG. 10, a PDCP entity is provided according to an embodiment of the present disclosure. The PDCP entity may include:

an information receiving unit 1001, configured to receive at least one PDU transmitted by at least one RLC entity;

a reordering sequence number extracting unit 1002, configured to extract a reordering sequence number from each PDU of the at least one PDU; and an information processing unit 1003, configured to determine, based on the reordering sequence number, an information transmitting order of the RLC entity corresponding to each PDU, and order the at least one PDU at least based on the information transmitting order.

The connection function between the PDCP entity and at least one RLC entity may be as shown in FIG. 2 and FIG. 3. It can be seen from the figures that one or more RLC entities may be managed by one PDCP entity. In addition, a MAC entity and other functional entity as shown in the figures will not be described again herein. There is a one-to-many mapping relationship between PDCP and RLC, and one of the bearers of PDCP may be mapped to multiple RLC bearers.

Referring to FIG. 5, the functionality of a PDCP entity provided by the embodiment may include a routing function. Data routing among multiple RLC entities and RSN distribution used in ordering may be implemented through the routing function. When routing data to different RLC entities, it is required to associate it to a single RSN. The order of PDCP PDUs to be transmitted by different RLC entities may be determined with RSN which is used in a sequential and cycling way.

Based on the foregoing scenario, before extracting the reordering sequence number from each PDU of the at least one PDU, the method further includes: extracting, by the PDCP entity, a sequence number (SN) from each PDU of the at least one PDU as received.

Further, the PDCP entity may further include: a sequence number extracting unit 1004, configured to extract the SN from each PDU of the at least one PDU.

Positions of the SN and the reordering sequence number within each PDU may be preset number of data bits added prior to or subsequent to the original SN data bits of the PDU. The reordering sequence number may be added through the preset number of data bits.

The information processing unit 1003 may be configured to order the at least one PDU based on the SN and the reordering sequence number.

The information processing unit 1003 may be configured to order PDCP PDUs from multiple RLC entities, which ensures PDCP SNs in order, while maintaining values of HFN and COUNT.

The original reordering function is optimized. Sequence numbering function is responsible for maintaining the order of the PDCP SN. Routing function is responsible for transmitting PDCP PDUs to different RLC entities while maintaining the order of the PDCP SNs. The RSN is used in a sequential and cycling way. A schematic diagram of routing functions of a receiving side may be as shown in FIG. 5, where one RSN may be used by multiple PDCP PDUs transmitted to a same RLC entity simultaneously. A schematic diagram of the reordering function on a receiving side is as shown in FIG. 8, where these PDCP PDUs may be ordered by the PDCP by using RSN. In a non-reestablishment case, delivering PDUs in order can only be guaranteed within one RLC, and the PDCP PDUs among RLCs may be ordered according to RSN on receiving side. With the RSN and SN two-stage approach, all PDCP PDUs may be reordered by connecting multiple segments of PDCP PDUs, each of which is ordered internally in sequence in accordance with the RSN. Compared with the related art only using a PDCP SN ordering approach, the process of ordering can be simplified. In a reestablishment case, some of PDCP SNs may be out of sequence as the RLC could not guarantee that data delivered to the PDCP is in sequence, especially in AM case. In the related art, in the case where there is a big difference between the respective air interface delays, there may be an excessively wide span between SNs of PDCP transmitted through multiple RLC entities. There may be issues that the reordering window may be not proper and the value of COUNT may be wrongly calculated, as there are only operations of increasing by one and decreasing by one for maintaining the value of COUNT in the related art. In the present disclosure, by adding the RSN, SNs of an excessively wide span may be replaced by RSNs which may be of a smaller span and ordered easily. The maintainability of the value of COUNT can be guaranteed by maintaining the order of RSNs. The RSN can be considered as a further extension of the length of the SN or a two-stage PDCP SN.

It can be seen that, based on the above solutions, a reordering sequence number can be added to the information transmitting order corresponding to an RLC entity mapped to a PDU, when the PDU is transmitted by a PDCP entity. Therefore, the PDUs transmitted by different RLC entities can be distinguished according to the reordering sequence number, so that the PDUs can be ordered at a receiving side according to the reordering sequence number in addition to the original SN of the PDUs. The delay of ordering PDUs can be reduced, thereby the processing efficiency on the receiving side can be improved.

It should be noted that, such terms as "include", "contain" or any variations thereof used in the specification are intended to cover a non-exclusive inclusion, and a process, a method, an article, or a device that includes a list of elements not only includes those elements, but may also include other elements that are not expressly listed or may also include other elements that are inherent to such process, method, article, or device. An element defined by "includes a . . . ", without more constraints, does not preclude the existence of additional identical elements in the process, method, article, or device that includes the element.

The above-mentioned serial numbers of the embodiments of the present disclosure are merely for description, and do not represent advantages and disadvantages of the embodiments.

Based on the foregoing descriptions of the implementations, a person skilled in the art can clearly understand that the methods in the above embodiments may be implemented by means of software and a necessary general hardware platform, and of course, can also be implemented by means of hardware, and the former is preferred in many cases. Based on such understanding, the technical solutions of the present disclosure essentially or the part contributing to the prior art may be implemented in a form of a software product. A computer software product may be stored in a memory medium, such as a read-only memory (ROM), a random access memory (RAM), a magnetic disk, or an optical disc, and includes several instructions for instructing a terminal device (which may be a mobile phone, a personal computer, a server, an air conditioner, a network-side device, or the like) to perform the methods described in the embodiments of the present disclosure.

The foregoing descriptions are merely embodiments of the present application, but are not intended to limit the scope of the present application. An equivalent structural or equivalent process alternation made by using the content of the specification and the drawings of the present application, or an application of the content of the specification and the drawings directly or indirectly to another related technical field, shall fall within the protection scope of the present disclosure.

A PDCP entity is further provided according to an embodiment of the present disclosure. The PDCP entity may include: a processor and a memory configured to store computer programs executable in the processor.

The processor may be configured to execute the steps of the method according to the first and second embodiments when the computer programs are executed.

A computer storage medium is further provided according to an embodiment of the present disclosure. The computer storage medium may store computer executable instructions for implementing the steps of the method according to the first and second embodiments when executed.

The above descriptions are merely specific embodiments of the present disclosure, and the scope of the present application is not limited hereto. Those skilled in the art may make various improvements and substitutions without departing from the principle of the present disclosure. All such improvements and substitutions shall be covered by the present disclosure. Therefore, the scope of the present application shall be subject to the protection scope of the claims.

What is claimed is:

1. A method for transmitting information, comprising:
determining, by a Packet Data Convergence Protocol (PDCP) entity, an information transmitting order of at least one Radio Link Protocol (RLC) entity managed by the PDCP entity, and determining, based on the information transmitting order, a reordering sequence number corresponding to each of the at least one RLC entity;
determining a Protocol Data Unit (PDU) to be transmitted by each of the at least one RLC entity, and adding the reordering sequence number to the PDU; and
mapping the PDU to a corresponding one of the at least one RLC entity.

2. The method according to claim 1, wherein before determining the PDU to be transmitted by each of the at least one RLC entity, the method further comprises:
assigning, by the PDCP entity, a sequence number (SN) to at least one PDU to be transmitted.

3. The method according to claim 2, wherein after determining the PDU to be transmitted by each of the at least one RLC entity, the method further comprises:
adding the SN and the reordering sequence number to the at least one PDU.

4. A method for receiving information, comprising:
receiving, by a PDCP entity, at least one PDU transmitted by at least one RLC entity;
extracting a reordering sequence number from each PDU of the at least one PDU; and
determining, based on the reordering sequence number, an information transmitting order of the RLC entity corresponding to each PDU, and ordering the at least one PDU at least based on the information transmitting order.

5. The method according to claim 4, further comprising:
extracting, by the PDCP entity, a sequence number (SN) from each PDU of the at least one PDU as received.

6. The method according to claim 5, wherein the ordering the at least one PDU at least based on the information transmitting order comprises:
ordering the at least one PDU based on the SN and the information transmitting order of the at least one RLC entity corresponding to the reordering sequence number.

7. A PDCP entity, comprising:
a processor and a memory configured to store computer programs that are executable in the processor, wherein when the computer programs are executed, the processor is configured to:
determine an information transmitting order of at least one RLC entity managed by the PDCP entity, and determine, based on the information transmitting order, a reordering sequence number corresponding to each of the at least one RLC entity;
determine a Protocol Data Unit (PDU) to be transmitted by each of the at least one RLC entity, and add the reordering sequence number to the PDU; and
map the PDU to a corresponding one of the at least one RLC entity.

8. The PDCP entity according to claim 7, wherein the processor is further configured to:
assign a sequence number (SN) to at least one PDU to be transmitted.

9. The PDCP entity according to claim 8, wherein the processor is further configured to:
add the SN and the reordering sequence number to the at least one PDU.

10. A PDCP entity, configured to perform the method according to claim 4, comprising:
a processor and a memory configured to store computer programs that are executable in the processor, wherein when the computer programs are executed, the processor is configured to:
receive at least one PDU transmitted by at least one RLC entity;
extract the reordering sequence number from each PDU of the at least one PDU; and
determine, based on the reordering sequence number, the information transmitting order of the RLC entity corresponding to each PDU, and order the at least one PDU at least based on the information transmitting order.

11. The PDCP entity according to claim 10, wherein the processor is further configured to:
extract a sequence number (SN) from each PDU of the at least one PDU as received.

12. The PDCP entity according to claim 11, wherein the processor is further configured to order the at least one PDU based on the SN and the reordering sequence number.

13. A non-transitory computer storage medium, configured to store computer executable instructions for implementing steps of the method according to claim 1 when executed.

14. The method according to claim 1, wherein the PDCP entity manages a plurality of RLC entities.

15. The method according to claim 1, wherein the adding the reordering sequence number to the PDU comprises: adding the reordering sequence number to the PDU in a sequential and cycling way.

\* \* \* \* \*